(12) United States Patent
Sieleman

(10) Patent No.: US 6,650,969 B1
(45) Date of Patent: Nov. 18, 2003

(54) ELECTRICAL FAULT PROTECTION SYSTEM

(75) Inventor: Michael Timm Sieleman, Durham, ME (US)

(73) Assignee: Bath Iron Works Corporation, Bath, ME (US)

( * ) Notice: Subject to any disclaimer, the term of this patent is extended or adjusted under 35 U.S.C. 154(b) by 0 days.

(21) Appl. No.: 09/369,606

(22) Filed: Aug. 6, 1999

(51) Int. Cl.$^7$ ................................................. H02J 1/14
(52) U.S. Cl. ........................ 700/292; 700/286; 361/63; 361/64; 361/67
(58) Field of Search ................................ 700/286, 242, 700/243; 361/62–70, 80, 64–68

(56) References Cited

U.S. PATENT DOCUMENTS

| | | | | |
|---|---|---|---|---|
| 4,300,182 A | * | 11/1981 | Schweitzer, III | 361/79 |
| 4,335,413 A | | 6/1982 | Engel et al. | 361/932 |
| 4,730,223 A | | 3/1988 | Ikeda et al. | 700/293 |
| 4,833,564 A | | 5/1989 | Pardue et al. | 361/94 |
| 4,862,308 A | * | 8/1989 | Udren | 361/45 |
| 4,996,646 A | * | 2/1991 | Farrington | 700/293 |
| 5,166,887 A | | 11/1992 | Farrington et al. | 361/93.2 |
| 5,170,360 A | * | 12/1992 | Porter et al. | 700/293 |
| 5,181,155 A | | 1/1993 | Beg et al. | 324/142 |
| 5,311,392 A | | 5/1994 | Kinney et al. | 386/112 |
| 5,369,356 A | | 11/1994 | Kinney et al. | 361/93.6 |
| 5,488,532 A | * | 1/1996 | Mrowiec et al. | 361/63 |
| 5,659,453 A | | 8/1997 | Russell et al. | 361/93.1 |
| 5,684,710 A | * | 11/1997 | Ehlers et al. | 700/293 |
| 5,701,226 A | * | 12/1997 | Gelbien et al. | 361/63 |
| 5,734,576 A | | 3/1998 | Klancher | 700/293 |
| 5,783,999 A | | 7/1998 | Price et al. | 340/664 |
| 5,822,165 A | | 10/1998 | Moran | 361/78 |
| 6,111,735 A | * | 8/2000 | Nelson et al. | 361/64 |

* cited by examiner

Primary Examiner—Albert W. Paladini
Assistant Examiner—Chad Rapp (57) ABSTRACT

A fault protection system whose trip logic considers power magnitude and direction at first and second points on a conductor is provided. Under normal operating conditions, power flows in the same direction through first and second points on the conductor. Under faulted conditions, a differential power condition exists; that is, the power flowing at a first point on the conductor is of different magnitude and/or direction than the power flowing at a second point on the conductor. The trip logic identifies the differential power condition as the result of a fault between the first and second points on the conductor and causes a protective device on each side of the fault to trip open, thus isolating the fault.

26 Claims, 7 Drawing Sheets

ELECTRICAL FAULT PROTECTION SYSTEM

BACKGROUND OF THE INVENTION

1. The Technical Field

The invention relates generally to electrical fault protection systems and, more particularly, to electrical fault protection systems providing for communication of information among the system's protective devices.

2. The Prior Art

Fault protection systems (FPS's) for protecting electrical power distribution systems (PDS's) and components thereof have long been known in the art. A properly designed FPS isolates faults without unnecessarily isolating functional portions of the PDS.

Known FPS's typically use protective devices such as circuit breakers and fuses to isolate faults. Conventional circuit breakers and fuses are limited in their ability to precisely locate and isolate faults. Such devices typically are designed to trip based on predetermined time-current characteristics. That is, they are designed to trip after having passed a predetermined amount of excess current for a predetermined time. They are not designed to precisely identify fault locations.

Despite the limitations of conventional circuit breakers and the like, FPS's using them can be designed so that, under many fault scenarios, the protective device immediately upstream of a fault will trip prior to protective devices farther upstream. Under ideal circumstances, a properly coordinated FPS can isolate faults with minimal disruption to unfaulted portions of the PDS.

However, under certain fault scenarios, conventional protective devices immediately upstream of a particular fault might not trip prior to conventional protective devices farther upstream. Under such scenarios, undamaged portions of the PDS might be unnecessarily isolated. Accordingly, FPS's using conventional circuit breakers have limited ability to isolate faults precisely without undue disruption to unfaulted portions of the PDS, particularly where the FPS comprises a power grid network where a particular protective device may be either upstream or downstream of another protective device, depending on the configuration of the power grid network.

Some prior art protective devices monitor current direction and incorporate trip logic which considers current direction, as well as current magnitude, through the device. These devices can be used to isolate faults somewhat more precisely than other conventional protective devices. However, they are also limited in their ability to isolate faults without unnecessarily isolating unfaulted portions of the systems.

One known FPS comprises current monitors and protective switching devices which are located at strategic points about the PDS. The FPS further comprises a microprocessor and a communications network through which the microprocessor communicates with each of the current monitors and protective switching devices. When the microprocessor's analysis of data it receives from one or more of the current monitors indicates the presence of a faulted condition, the microprocessor selectively transmits trip signals to those protective devices which the microprocessor perceives can most effectively isolate the fault without unduly isolating unfaulted portions of the PDS. Given a sufficient number of monitoring points and protective devices, this FPS can identify and isolate faults with a great degree of precision. However, the communications network used by this FPS is relatively complicated. Consequently, the FPS is not easily adapted to changes in the PDS architecture.

The foregoing system's complexity lies in part in the manner in which the microprocessor recognizes inputs from the various current monitors and protective devices about the PDS. Each current monitor and protective device comprising the FPS is assigned a unique address through which it communicates with the microprocessor, i.e., the microprocessor recognizes the current monitors and protective devices by their addresses, not their actual physical locations. Therefore, it is critical that the current monitor and protective device addresses are accurately programmed so that the devices' addresses are accurately correlated to the devices' actual physical locations within the PDS. If any such addresses are not accurately programmed, the FPS is likely to respond to a fault on the PDS incorrectly. That is, the FPS may fail to isolate a fault, or it may inappropriately isolate an unfaulted portion of the PDS.

Ensuring that the current monitor and protective switching device addresses are properly correlated to their installed locations can be a complicated task, and one which must be executed each time the PDS is expanded or otherwise modified. Large portions of the PDS may need to be taken out of service while testing the system to verify that the addressing is correct. Such testing can be complicated and time consuming, and may require disruption to portions of the PDS which otherwise are not directly affected by the modifications.

Given its limitations, the foregoing FPS is best-suited for applications wherein the PDS configuration, once designed and constructed, is substantially fixed and not subject to revision. An example of such a system is the PDS for a ship. The foregoing FPS is not well-suited for use with a PDS which is subject to frequent modification or expansion or which cannot practically be taken out of service for modification or testing. Examples of such systems can include the PDS's associated with commercial buildings and industrial facilities.

SUMMARY OF THE INVENTION

The invention is an advanced fault protection system that identifies the locations of faults in a power distribution system with a high degree of precision and causes such faults to be isolated quickly, without unnecessarily isolating or disrupting service to unfaulted portions of the PDS.

The FPS according to a preferred embodiment of the present invention identifies fault locations by monitoring power flow into and out of each power feed at each node in the PDS. In alternate embodiments, power flow can be monitored at fewer than all of the power feeds and/or nodes in the PDS. However, the greater the proportion of power feeds and/or nodes where power flow is monitored, the greater the FPS' ability to precisely identify and isolate faults.

In a preferred embodiment, one or more power feeds connect each node in the PDS to other nodes. A circuit interrupter, such as a circuit breaker, load break switch, or other device capable of interrupting power in response to a trip signal, is located near each end of each power feed, near the node at that end of the power feed. A power monitor associated with each circuit interrupter monitors the magnitude and/or direction of power flowing through a monitoring point in the conductor and generates a signal indicative thereof. The power monitor may be integral to the circuit interrupter, or it may be a separate unit. In a preferred embodiment, each power monitor's monitoring point is proximate the power monitor's associated circuit interrupter. In some embodiments, it may be desirable to use current monitors instead of power monitors and to monitor current instead of power, as would be known to one skilled in the art.

A communications channel is provided whereby the signal generated by each power monitor is communicated to trip logic associated with its corresponding circuit interrupter and to trip logic associated with its complementary circuit interrupter, i.e., the circuit interrupter at the opposite end of the power feed. The trip logic associated with each circuit interrupter thus receives signals indicative of the magnitude and/or direction of power detected by its corresponding power monitor and the magnitude and/or direction of power detected by its complementary power monitor. In one embodiment of the invention, the communications channel is a hardwired communications line. In an alternate embodiment, the communications channel is a wireless communications channel.

The trip logic associated with each circuit interrupter is designed to recognize a faulted condition between its corresponding power monitor and its complementary power monitor when the signals it receives therefrom indicate that power is flowing in one direction past its corresponding power monitor and in the opposite direction past its complementary power monitor and/or that the power flowing past its corresponding power monitor is of substantially different magnitude than the power flowing past its complementary power monitor. In a preferred embodiment, where each power monitor senses power proximate its associated circuit interrupter, a fault located between a pair of complementary power monitors will also be located between the circuit interrupters associated with those power monitors.

Power flowing through each end of an unfaulted power feed has the same direction and substantially the same magnitude. Under such circumstances, based on the signals it receives from its corresponding and complementary power monitors, the trip logic associated with the circuit interrupter at each end of the power feed determines that no fault exists between its corresponding and complementary circuit interrupters, no trip signals are generated, and neither of the pair of complementary circuit interrupters changes state to an open state.

Power flowing through the first end of a faulted power feed has a different magnitude and/or direction than power flowing through the opposite end of the power feed. Under such circumstances, based on the signals it receives from its corresponding and complementary power monitors, the trip logic associated with the circuit interrupter at each end of the power feed recognizes that a fault exists between its corresponding and complementary circuit interrupters. Accordingly, the trip logic associated with the circuit interrupter at each end of the faulted power feed provides a trip signal to its associated circuit interrupter, causing its associated circuit interrupter to trip open. In this manner, the circuit interrupters at both ends of a faulted power feed trip open to isolate the power feed and the fault from the rest of the PDS.

The FPS can also be configured to identify faults on the node side of any of the circuit interrupters. In one such embodiment, the trip logic associated with each of the circuit interrupters at each end of a power feed is designed to recognize a faulted condition at a particular node when the power monitor associated with the circuit interrupter at that particular node fails to communicate a signal to its complementary circuit interrupter's trip logic and when fault current is flowing through the complementary circuit interrupter towards the particular node. That situation indicates potential physical damage to the power monitor and/or circuit interrupter at the particular node which is likely to be the result of a fault at that node. In that situation, the complementary circuit interrupter is caused to trip open. On the other hand, the situation where the power monitor associated with the circuit interrupter at that particular node fails to communicate a signal to its complementary circuit interrupter's trip logic but no fault current is flowing through the complementary circuit interrupter towards the particular node is indicative of the failure of the power monitor at the particular node or of a failed communications line; it is not indicative of a fault. Accordingly, in this situation, neither of the circuit interrupters at opposite ends of the power feed is caused to trip open.

In an alternate embodiment, communications are also established between each of the power monitors and the trip logic associated with each of the circuit interrupters located at each node. Should a fault occur at a node, i.e., on the node side of the circuit interrupters adjacent the node, the trip logic associated with each of those circuit interrupters determines that the amount of power entering the node exceeds the amount of power exiting the node, based on the signals the trip logic associated with each of those circuit interrupters receives from the several power monitors. Accordingly, the trip logic associated with each of those circuit interrupters recognizes a node-side fault and provides a trip signal to its associated circuit interrupter. Each of the circuit interrupters adjacent the faulted node then trips, thus isolating the node with minimal impact on the unaffected portions of the PDS.

Any or all of the circuit interrupters comprising the FPS may further incorporate conventional trip logic which will cause the circuit interrupters to trip in the presence of certain overcurrent conditions, and/or in the event that other portions of the advanced fault protection system of the present invention fail to operate as designed.

DETAILED DESCRIPTION OF THE DRAWINGS

Figure 1:
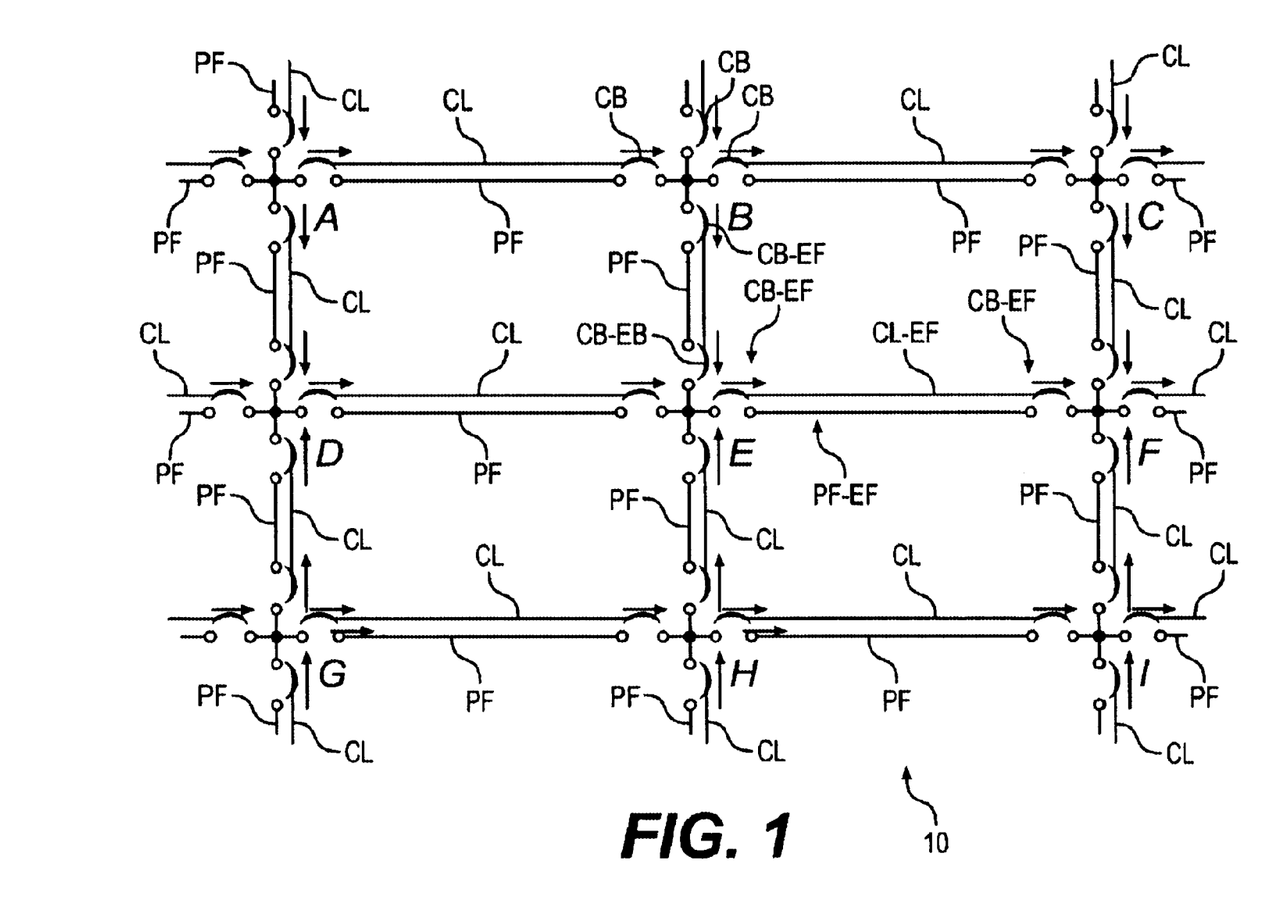
FIG. 1 is a schematic representation of a grid-type power distribution system incorporating the fault protection system of the present invention.

FIG. 1 illustrates a portion of a typical grid-type electrical power distribution system (PDS) 10 according to the present invention. PDS 10 comprises nodes A through I, wherein each of nodes A through I may represent a power source (such as a generator or utility power feed), a substation, a switchboard, a load center, a power panel, a power distribution box, a load, or any other such component which may comprise a PDS.

FIG. 1 illustrates four power feeds PF leading to and from each node A through I. For example, power feed PF-EF connects node E to node F. However, the number of power feeds leading to and from each node could be greater than four or as few as two. A circuit interrupter such as circuit breaker CB is located at each end of each power feed PF connecting the various nodes. In other embodiments, circuit breakers CB may be replaced with load break switches or any other devices capable of interrupting current in response to a trip signal. Each of circuit breakers CB can be tripped manually or automatically, according to predetermined trip logic, to isolate any of nodes A through I, or any of power feeds PF interconnecting nodes A through I, from other portions of the PDS.

In a preferred embodiment of the invention, each of circuit breakers CB is associated with a conventional power monitor (not shown) which monitors the direction and/or magnitude of power flowing through a point of the corresponding power feed, preferably at or near the circuit breaker, and which generates a signal indicative thereof. Each power monitor may be integral with its corresponding circuit breaker, or it may be a discrete device (not shown) which is separate from its corresponding circuit breaker, but functionally connected to its corresponding circuit breaker's trip logic, as explained below. In an alternate embodiment, fewer than each of circuit breakers CB is associated with a power monitor. In some embodiments, it may be desirable to use current monitors in lieu of power monitors and to monitor current instead of power, as would be known to one skilled in the art.

Communications lines CL provide communications between each power monitor and trip logic associated with each power monitor's corresponding circuit breaker and trip logic associated with each power monitor's complementary circuit breaker, i.e., the circuit breaker at the opposite end of the power feed. For example, the power monitor associated with circuit breaker CB-EF provides a signal indicative of the magnitude and/or direction of power flowing past the power monitor to trip logic associated with its corresponding circuit breaker CB-EF and to trip logic associated with its complementary circuit breaker CB-FE. Likewise, the power monitor associated with circuit breaker CB-FE provides a signal indicative of the magnitude and/or direction of power flowing past the power monitor to trip logic associated with its corresponding circuit breaker CB-FE and to trip logic associated with its complementary circuit breaker CB-EF. In an alternate embodiment of the invention, a wireless communications channel may replace each communications line CL.

Trip logic associated with each circuit breaker CB is designed to recognize a faulted condition between its corresponding power monitor and its complementary power monitor when the signals it receives therefrom indicate that power is flowing in one direction past its corresponding power monitor and in the opposite direction past its complementary power monitor and/or that the power flowing past its corresponding power monitor is of substantially different magnitude than the power flowing past its complementary power monitor. In a preferred embodiment, where each power monitor senses power proximate its associated circuit breaker CB, a fault located between a pair of complementary power monitors will also be located between the circuit breakers CB associated with those power monitors. When the trip logic senses the foregoing conditions, it provides a trip signal to its corresponding circuit breaker CB, causing the circuit breaker CB to trip open.

Under normal operating conditions, as depicted in FIG. 1, power flows through the various power feeds PF and circuit breakers CB, generally from power sources (not shown) towards loads (not shown). In the absence of faults between nodes, power flows in the same direction through each pair of complementary circuit breakers CB, as is illustrated by the power direction arrow proximate each circuit breaker CB illustrated in FIG. 1. For example, in the scenario illustrated in FIG. 1, power flows from left to right through both circuit breakers CB-EF and CB-FE, from node E to node F. Furthermore, the magnitude of the power flowing through each of circuit breakers CB-EF and CB-FE is substantially the same.

The power monitor associated with each of circuit breakers CB-EF and CB-FE generates a signal indicative of the magnitude and/or direction of power flowing past the power monitor and communicates the signal to the trip logic associated with its corresponding circuit breaker and to the trip logic associated with its complementary circuit breaker. That is, the power monitor associated with circuit breaker CB-EF communicates a signal to trip logic associated with its corresponding circuit breaker CB-EF and to trip logic associated with its complementary circuit breaker CB-FE. Likewise, the power monitor associated with circuit breaker CB-FE communicates a signal to trip logic associated with its corresponding circuit breaker CB-FE and to trip logic associated with its complementary circuit breaker CB-EF.

Based on the signals provided by the power monitor associated with each of circuit breakers CB-EF and CB-FE, the trip logic associated with each of circuit breakers CB-EF and CB-FE senses that there is no fault between those power monitors and, therefore, between those circuit breakers. Accordingly, the trip logic associated with each of circuit breakers CB-EF and CB-FE does not generate a trip signal and neither of circuit breakers CB-EF and CB-FE trips open.

Figure 2:
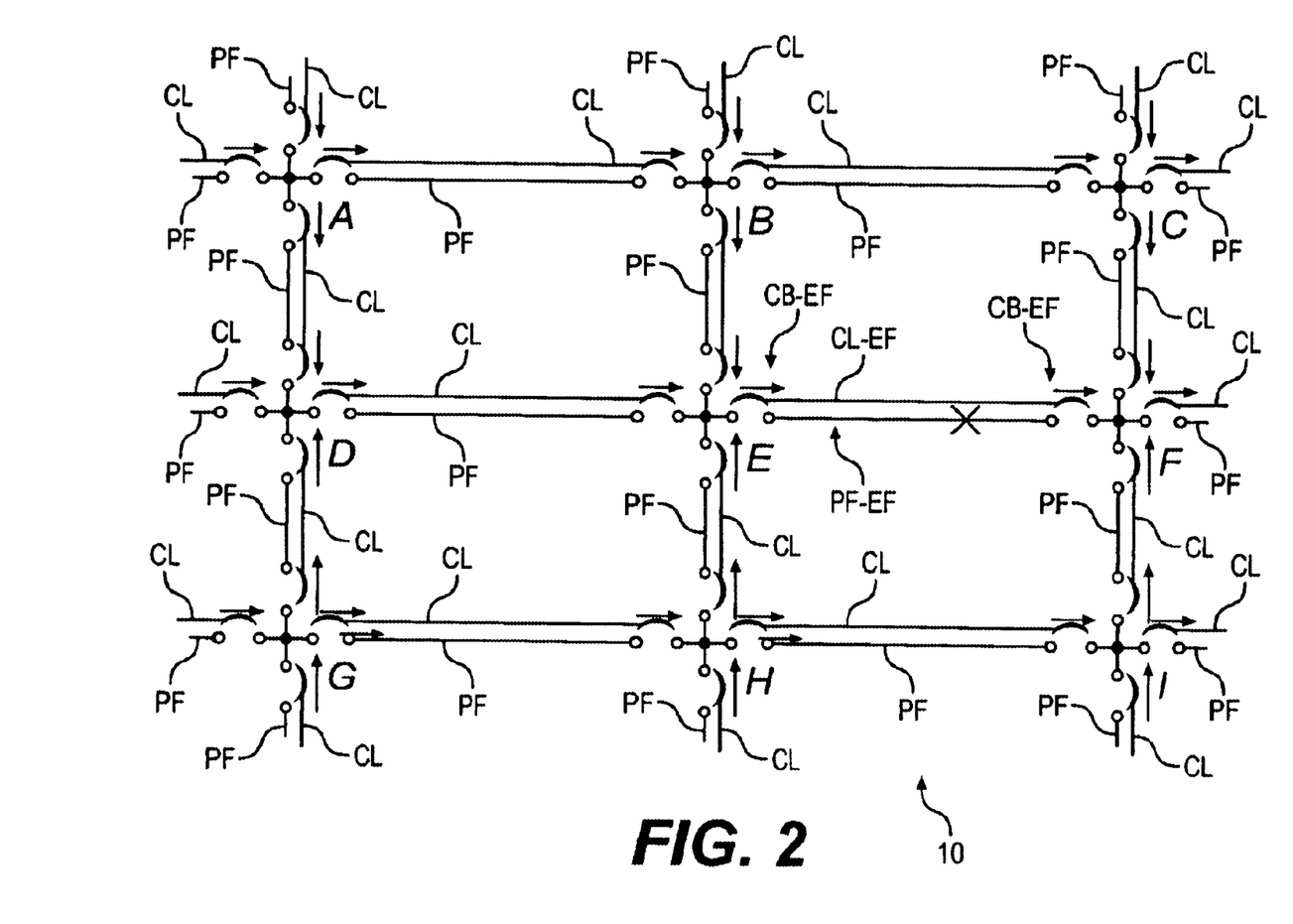
FIG. 2 is a schematic representation of a grid-type power distribution system with a fault present on the system.

FIG. 2 is identical to FIG. 1, except that it depicts a fault X on power feed PF-EF between nodes E and F and between circuit breakers CB-EF and CB-FE. As the power direction arrows indicate, power flows through circuit breaker CB-EF from node E and towards fault X, while power flows through circuit breaker CB-FE from node F, also towards fault X. The power monitor associated with each of circuit breakers CB-EF and CB-FE generates a signal indicative of this information and communicates the signal to trip logic associated with its corresponding circuit breaker and to trip logic associated with its complementary circuit breaker. Thus, the trip logic associated with each of circuit breakers CB-EF and CB-FE senses that fault X is located between the power monitors associated with circuit breakers CB-EF and CB-FE and, therefore, between circuit breakers CB-EF and CB-FE, in a preferred embodiment. Accordingly, the trip logic associated with each of circuit breakers CB-EF and CB-FE initiates a trip of its corresponding circuit breaker, thus isolating fault X and power feed PF-EF. With circuit breakers CB-EF and CB-FE tripped and power feed PF-EF thus isolated, the remainder of the PDS is minimally affected, and power can still be supplied to and/or from every other point in the PDS.

Figure 3:
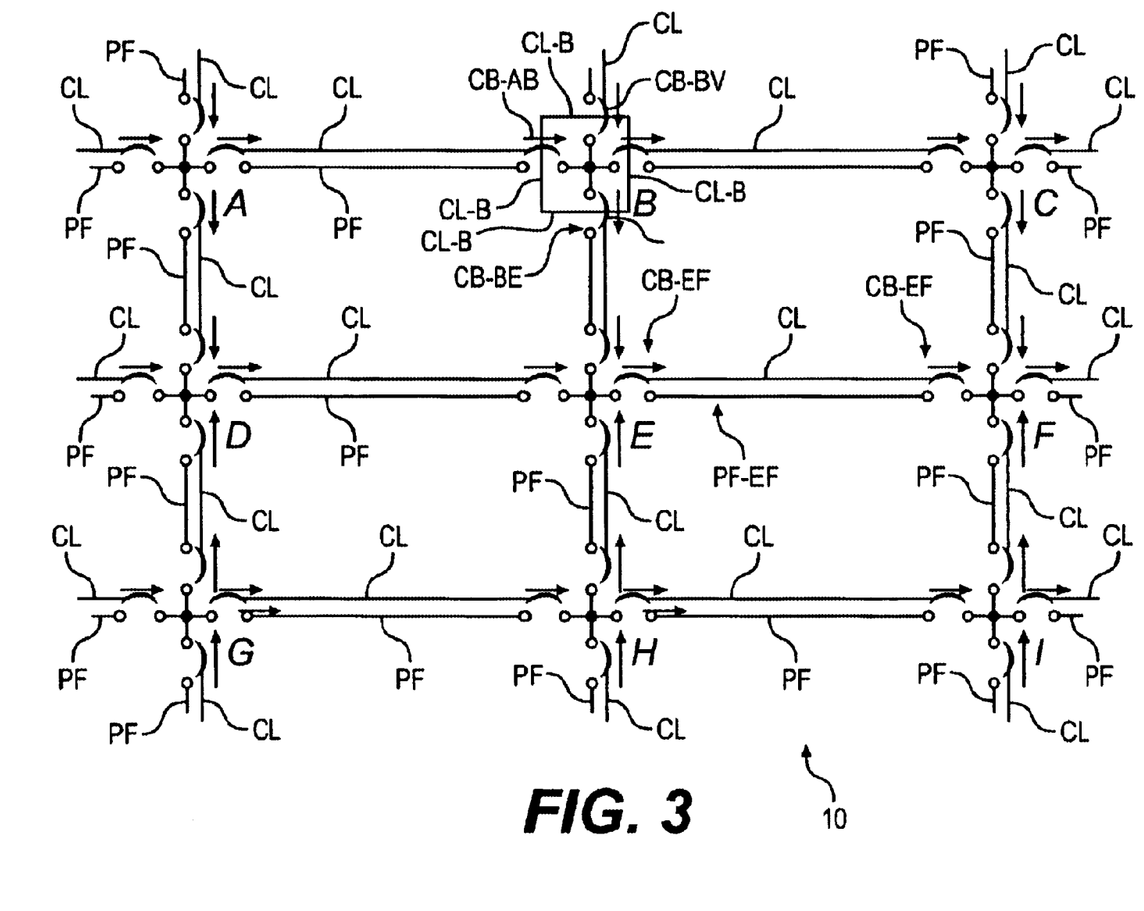
FIG. 3 is a schematic representation of a grid-type power distribution system incorporating an alternate embodiment of a fault protection system according to the present invention.

The FPS according to the present invention can also be configured to identify and isolate faults on the node side of any of circuit breakers CB. In one such embodiment, communications lines interconnect the power monitors associated with each of the circuit breakers adjacent a particular node. For example, as illustrated in FIG. 3, communications lines CL-B interconnect the power monitors and trip logic associated with each of circuit breakers CB-BU, CB-BA, CB-BE, and CB-BC. If the trip logic associated with each of circuit breakers CB-BU, CB-BA, CB-BE, and CB-BC detects a power collision at node B, i.e., more power entering node B than leaving node B, based on signals provided by the corresponding power monitors, each such trip logic recognizes that a faulted condition (not shown) exists at node B, and each such trip logic provides a trip signal to its corresponding circuit breaker. Each of circuit breakers CB-BU, CB-BA, CB-BE, and CB-BC bounding node B is caused to trip open, thus isolating node B from the rest of the PDS.

In an alternate embodiment, the trip logic associated with each circuit breaker CB can be designed so that it concludes that a fault exists at a particular node if one or more of the power monitors associated with the circuit breakers adjacent that node fail to communicate with the trip logic associated with their complementary circuit breakers. In a further alternative embodiment, in a situation where only one power monitor associated with a circuit breaker adjacent a particular node fails to communicate with the trip logic associated with its complementary circuit breakers, the trip logic can be designed to recognize this condition as a single failure associated with the non-communicating power monitor or its associated communications line, not the node. Accordingly, the trip logic associated with each of the circuit breakers bounding the node would not provide a trip signal to its associated circuit breaker and the node would not be isolated. For example, the situation where the power monitor associated with a circuit breaker adjacent a particular node fails to communicate a signal to its complementary circuit breaker's trip logic, but the power monitor associated with the complementary circuit breaker does not detect fault current flowing thereat, is indicative of a failure of the communications channel, not a fault at the node. The trip logic can be designed so that the complementary circuit breaker will not trip in this situation.

Figure 4:
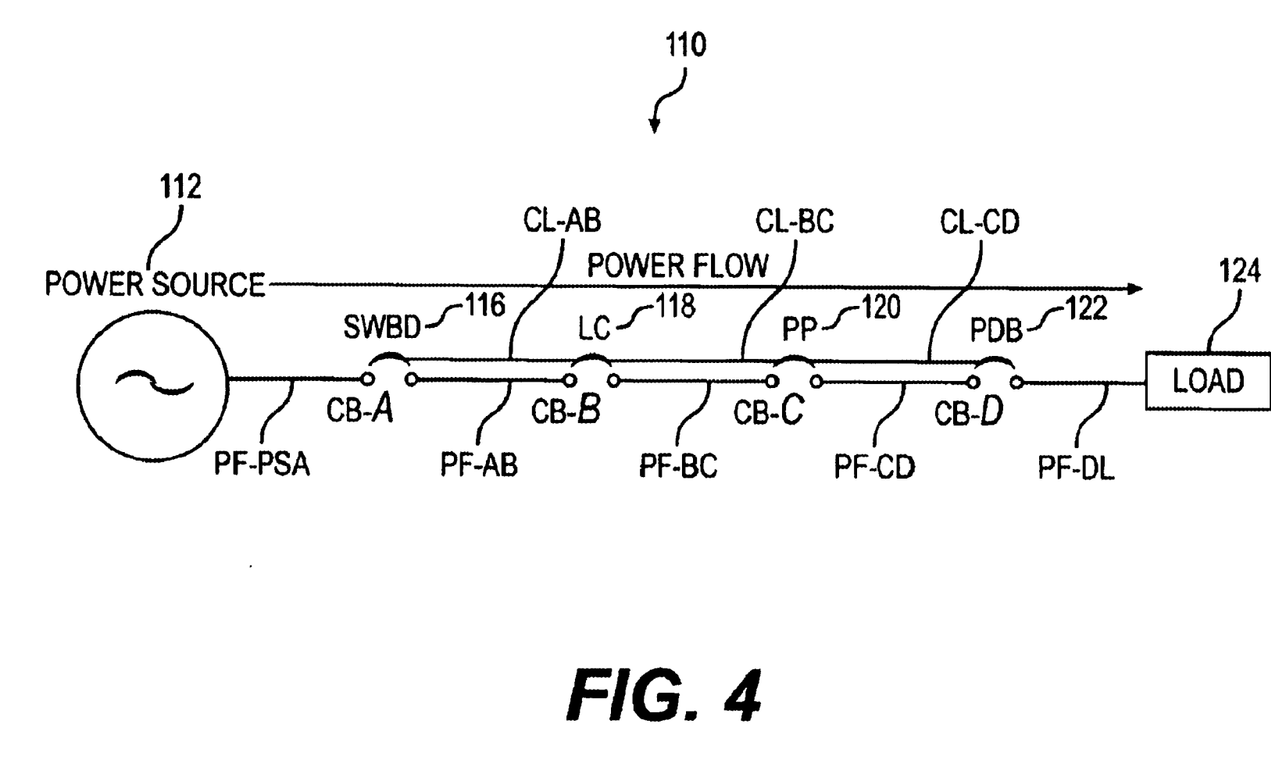
FIG. 4 is a schematic representation of a radial-type power distribution network.

FIG. 4 illustrates a radial power distribution system (RPDS) 110 according to the present invention. RPDS 110 includes a power source 112, which can be any source of electrical power, such as a local generator or a utility power feed. RPDS 110 further includes switchboard 116, load center 118, power panel 120, power distribution box 122, and load 124, each of which are interconnected by power feeds PF-PSA, PF-AB, PF-BC, PF-CD, and PF-DL, respectively. Each of switchboard 116, load center 118, power panel 120, and power distribution box 122 comprises a circuit breaker, such as CB-A, CB-B, CB-C, and CB-D, by means of which certain portions of RPDS 110 can be isolated from other portions of RPDS 110. A conventional power monitor (not shown) is associated with each circuit breaker CB.

Although FIG. 4 illustrates only one switchboard 116, load center 118, power panel 120, and power distribution box 122, it is understood that power source 112 may feed a plurality of switchboards 116, each of which may feed a plurality of load centers 118, each of which may feed a plurality of power panels 120, and so on.

Communications lines CL are provided between the power monitor associated with each particular circuit breaker CB and the trip logic associated the particular circuit breaker CB and each of the adjacent circuit breakers CB. For example, the power monitor associated with circuit breaker CB-A located between power feeds PF-PSA and PF-AB is connected to the trip logic associated with circuit breakers CB-A and CB-B by communications line CL-AB. Further, the power monitor associated with circuit breaker CB-B located between power feeds PF-AB and PF-BC is connected to the trip logic associated with circuit breakers CB-A and CB-B by communications line CL-AB and to the trip logic associated with circuit breakers CB-B and CB-C by communications line CL-BC.

During normal operation, with no faults present in the system, power flows from power source 112, through switchboard 116, load center 118, power panel 120, power distribution box 122, and ultimately to load 124, via power feeds PF-PSA, PF-AB, PF-BC, PF-CD, and PF-DL. In this scenario, power flows in the same direction through each pair of adjacent circuit breakers. For example, power flows from power source 112 through circuit breakers CB-A and CB-B, through circuit breakers CB-B and CB-C, and through CB-C and CB-D, towards load 124. Since the same power flows through each of said circuit breakers, there is no difference in the direction and/or magnitude of the power flowing between any pair of adjacent circuit breakers.

Figure 5:
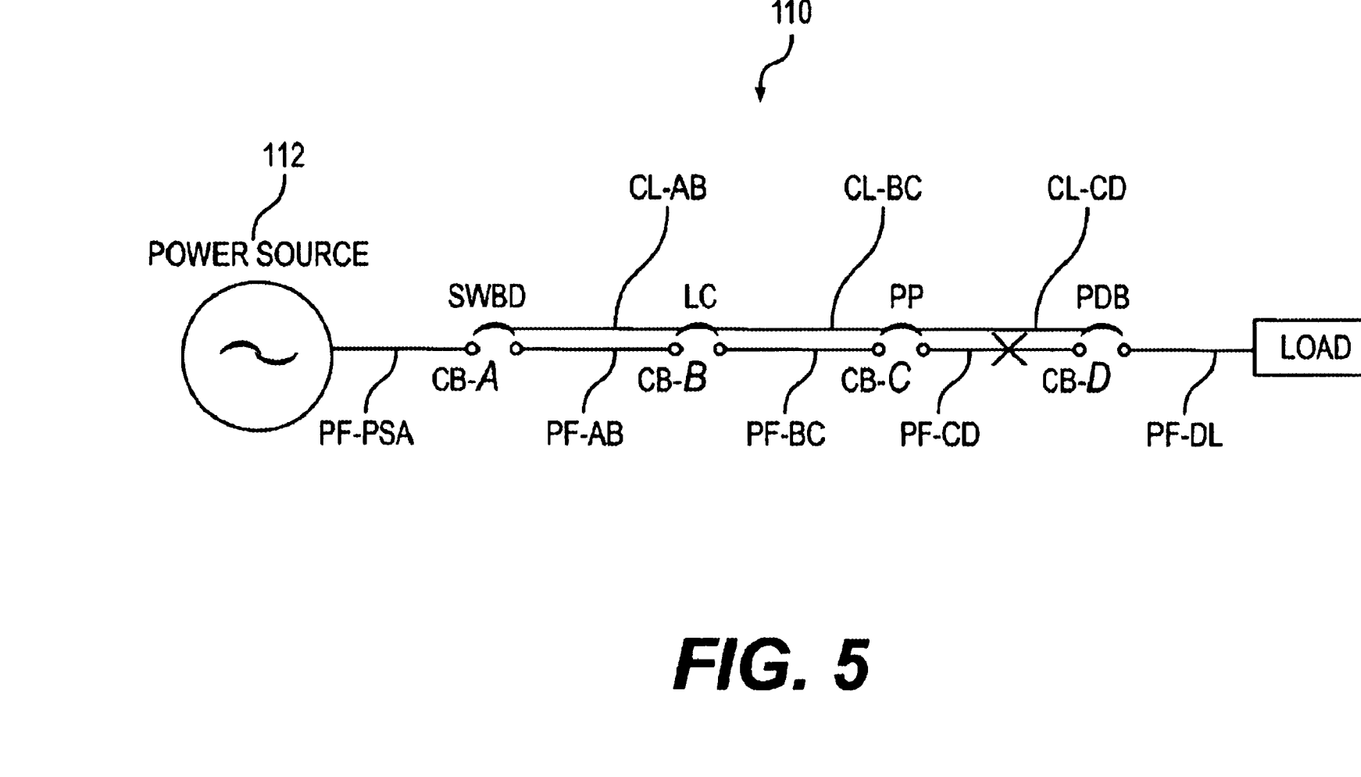
FIG. 5 is a schematic representation of a radial-type power distribution network with a fault present on the system.

FIG. 5 is identical to FIG. 4 except that it depicts a fault X on power feed PF-CD between power panel 120 and power distribution box 122. In this scenario, power again flows in the direction from power source 112 towards load 124. However, rather than flowing to load 124, the power is interrupted at fault X.

The trip logic associated with each of circuit breakers CB-A and CB-B does not sense any difference in the magnitude and/or direction of the power flowing between those circuit breakers, based on the signals provided by the power monitors associated with those circuit breakers. Accordingly, no trip signal is generated and circuit breakers CB-A and CB-B do not change state. The same is true of circuit breakers CB-B and CB-C.

The power monitor associated with circuit breaker CB-C detects power of known magnitude through circuit breaker CB-C from power feed PF-BC and to power feed PF-CD, and it sends a signal indicative thereof to the trip logic associated with circuit breaker CB-C and to the trip logic associated with circuit breaker CB-D. However, the power monitor associated with circuit breaker CB-D logic detects no power through circuit breaker CB-D, or it detects less power through circuit breaker CB-D than is flowing through breaker CB-C, and it sends a signal indicative thereof to the trip logic associated with circuit breaker CB-C and to the trip logic associated with circuit breaker CB-D. The trip logic associated with each of circuit breakers CB-C and CB-D concludes that a faulted condition is present between circuit breakers CB-C and CB-D. The trip logic associated with each of circuit breakers CB-C and CB-D provides a trip signal to its corresponding circuit breaker, circuit breakers CB-C and CB-D trip, and fault X is isolated from the balance of the PDS with minimal disruption thereto.

Figure 6:
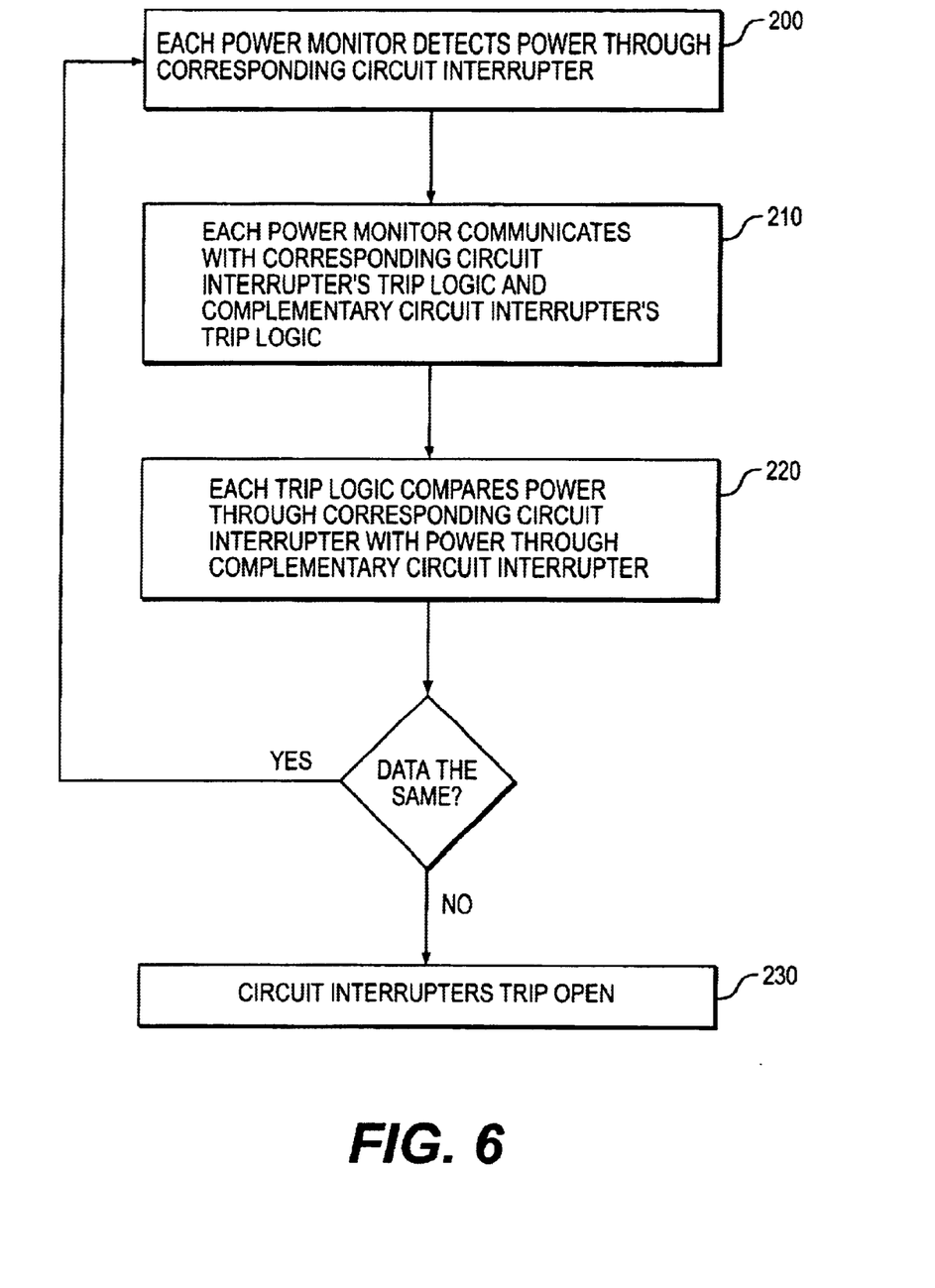
FIG. 6 is a flowchart outlining the operation of the present invention.

FIG. 6 illustrates the steps of a method of identifying and isolating faults according to a preferred embodiment of the present invention. First, the power monitors associated with the circuit breakers at opposite ends of a particular power feed detect power magnitude and/or direction thereat, Step 200. Each such power monitor communicates a signal indicative of the power magnitude and/or direction thereat to both the trip logic associated with its corresponding circuit breaker and the trip logic associated with its complementary circuit breaker, Step 210. The trip logic associated with each such circuit breaker compares the power magnitude and/or direction through its corresponding circuit breaker (the local power) with the power magnitude and/or direction through its complementary circuit breaker (the complementary power), Step 220. If the local power is the same as the complementary power, no action is taken, and the power monitors continue to monitor and communicate power data. If the local power is not the same as the complementary power, i.e., it differs in magnitude and/or direction, a fault is deemed to exist between the pair of complementary circuit breakers, a trip signal is generated, each of the pair of complementary circuit breakers trips open, and the fault is isolated, Step 230.

Figure 7:
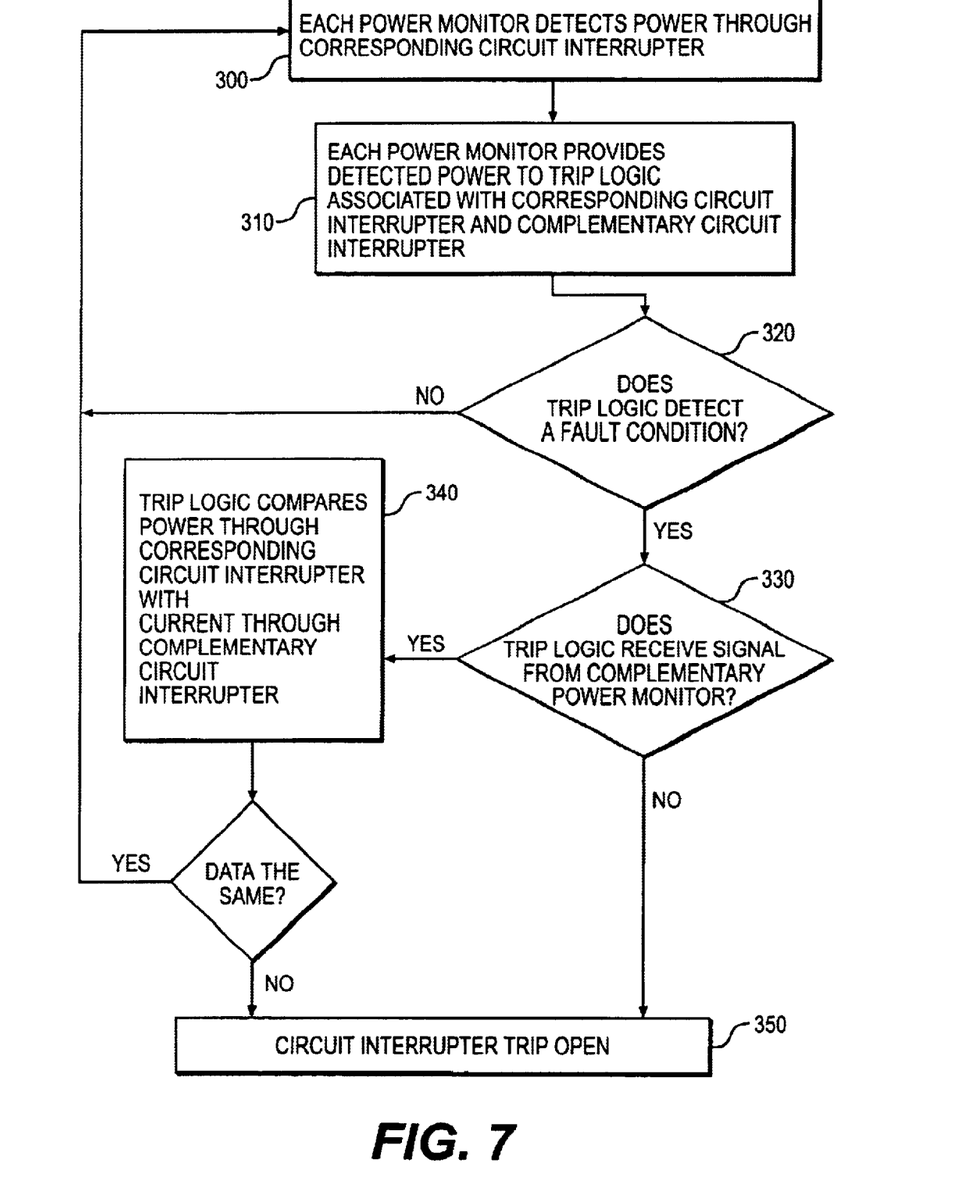
FIG. 7 is a flowchart outlining the operation of the present invention.

FIG. 7 illustrates the steps of an alternate embodiment of a method of identifying and isolating faults according to the present invention. First, the power monitors associated with the circuit breakers at opposite ends of a particular power feed detect power magnitude and/or direction thereat, Step 300. Each such power monitor provides a signal indicative of the power magnitude and/or direction thereat to both the trip logic associated with its corresponding circuit breaker and the trip logic associated with its complementary circuit breaker, Step 310. The trip logic associated with each such circuit breaker determines whether a fault condition exists at some point in the PDS, Step 320. In a preferred embodiment, a fault is deemed to exist if the trip logic associated with a particular circuit breaker detects a fault condition, based on the signal it receives from its corresponding power monitor. If the trip logic does not detect a fault condition, it does not generate a trip signal, and it continues to analyze the signals it receives from its corresponding power monitor and its complementary power monitor.

If the trip logic detects a fault condition, it determines whether it has received a signal from its complementary power monitor, Step 330. If the trip logic detects a fault condition, but does not receive a signal from its complementary power monitor, the fault condition is deemed to exist between the trip logic's corresponding circuit breaker and its complementary circuit breaker or proximate the node adjacent its complementary circuit breaker. Accordingly, the trip logic sends a trip signal to its corresponding circuit breaker, causing its corresponding circuit breaker to trip open, Step 350.

If the trip logic detects a fault condition, and it receives a signal from its complementary power monitor, it compares that signal with the signal it receives from its corresponding power monitor, Step 340. If the trip logic determines that the power flow detected by its complementary power monitor is of the same direction and substantially the same magnitude as the power flow detected by its corresponding power monitor, it determines that the fault condition does not lie between those two power monitors. Accordingly, the trip logic does not generate a trip signal, and it continues to analyze signals it receives from its corresponding power monitor and it complementary power monitor. If the trip logic determines that the power flow detected by its complementary power monitor is of different direction and/or substantially different magnitude as the power flow detected by its corresponding power monitor, it determines that a fault condition lies between those two power monitors. Accordingly, the trip logic sends a trip signal to its corresponding circuit breaker, causing its corresponding circuit breaker to trip open, Step 350.

The foregoing is a description of a preferred embodiment of the invention, as well as one or more alternate embodiments. However, the invention also can be embodied in many other ways, and its scope is limited only by the appended claims.

I claim:

1. A system for isolating faults on an electrical power distribution system having a first node, a second node, and a first conductor having a first end connected to said first node and a second end connected to said second node, comprising:

a first circuit interrupter for selectively interrupting current conducted through said first conductor, said first circuit interrupter having an open state in which current cannot be conducted through said first conductor and a closed state in which current can be conducted therethrough;

a first current monitor for generating a first signal responsive to the current flowing through said first conductor proximate a first point thereof;

a second current monitor for generating a second signal responsive to the current flowing through said first conductor proximate a second point thereof;

first trip logic for selectively causing said first circuit interrupter to change state to its open state in response to said first signal and said second signal; and a communications channel operably connecting both of said first and second signals to said first trip logic.

2. The system of claim 1 wherein said first point of said first conductor is near said first end thereof and wherein said second point of said first conductor is near said second end thereof.

3. The system of claim 1 wherein said first signal corresponds to the direction of current flowing through said first conductor proximate said first point thereof and said second signal corresponds to the direction of current flowing through said first conductor proximate said second point thereof and wherein said first trip logic causes said first circuit interrupter to change state to its open state when the direction of current through said first conductor proximate said first point thereof is different from the direction of current through said first conductor proximate said second point thereof.

4. The system of claim 1 wherein said first signal corresponds to the magnitude of current flowing through said first conductor proximate said first point thereof and said second signal corresponds to the magnitude of current flowing through said first conductor proximate said second point thereof and wherein said first trip logic causes said first circuit interrupter to change state to its open state when the magnitude of current through said first conductor proximate said first point thereof is substantially different from the magnitude of current through said first conductor proximate said second point thereof.

5. The system of claim 1 wherein said first trip logic causes said first circuit interrupter to change state to its open state when said first trip logic fails to receive a signal from said second current monitor.

6. The system of claim 1 further comprising:

a third node;

a second conductor having a first end connected to said second node and a second end connected to said third node;

a third circuit interrupter for selectively interrupting current conducted through said second conductor, said third circuit interrupter having an open state in which current cannot be conducted through said second conductor and a closed state in which current can be conducted therethrough;

a third current monitor for generating a third signal responsive to the current flowing through said second conductor proximate a first point thereof;

a fourth current monitor for generating a fourth signal responsive to the current flowing through said second conductor proximate a second point thereof;

third trip logic for selectively causing said third circuit interrupter to change state to its open state in response to said third signal and said fourth signal; and a communications channel operably connecting both of said third and fourth signals to said third trip logic.

7. The system of claim 1 wherein either of said nodes may comprise an electrical power source.

8. The system of claim 1 wherein either of said nodes may comprise an electrical sub-station.

9. The system of claim 1 wherein either of said nodes may comprise an electrical distribution panel.

10. The system of claim 1 wherein either of said nodes may comprise an electrical load.

11. The system of claim 6 wherein said first point of said second conductor is proximate a first end thereof and said second point of said second conductor is proximate a second end thereof.

12. The system of claim 6 wherein said third signal corresponds to the direction of current flowing through said second conductor proximate said first point thereof and said fourth signal corresponds to the direction current flowing through said second conductor proximate said second point thereof and wherein said third trip logic causes said third circuit interrupter to change state to its open state when the direction of current through said second conductor proximate said first point thereof is different from the direction of current through said second conductor proximate said second point thereof.

13. The system of claim 6 wherein said third signal corresponds to the magnitude of current flowing through said second conductor proximate said first point thereof and said fourth signal corresponds to the magnitude of current flowing through said second conductor proximate said second point thereof and wherein said third trip logic causes said third circuit interrupter to change state to its open state when the magnitude of current through said second conductor proximate said first point thereof is substantially different from the magnitude of current through said second conductor proximate said second point thereof.

14. The system of claim 6 further comprising:

a fourth circuit interrupter for selectively interrupting current conducted through said second conductor at a second point thereof, said fourth circuit interrupter having an open state in which current cannot be conducted therethrough and a closed state in which current can be conducted therethrough;

fourth trip logic for selectively causing said fourth circuit interrupter to change state to its open state in response to said third signal and said fourth signal; and said communications channel further operably connecting both of said third and fourth signals to said fourth trip logic.

15. The system of claim 6 wherein said third trip logic causes said third circuit interrupter to change state to its open state when said third trip logic fails to receive a signal from said fourth current monitor.

16. The system of claim 14 wherein said fourth trip logic causes said fourth circuit interrupter to change state to its open state when the direction of current through said second conductor proximate said first point thereof is different from the direction of current through said second conductor proximate said second point thereof.

17. The system of claim 14 wherein said fourth trip logic causes said fourth circuit interrupter to change state to its open state when the magnitude of current through said second conductor proximate said first point thereof is substantially different from the magnitude of current through said second conductor proximate said second point thereof.

18. The system of claim 14 wherein said fourth trip logic causes said fourth circuit interrupter to change state to its open state when said fourth trip logic fails to receive a signal from said third current monitor.

19. A system for isolating faults on an electrical power distribution system having a first node, a second node, and a first conductor having a first end connected to said first node and a second end connected to said second node, comprising:

a first circuit interrupter for selectively interrupting current conducted through said first conductor, said first circuit interrupter having an open state in which current cannot be conducted through said first conductor and a closed state in which current can be conducted therethrough;

a first current monitor for generating a first single responsive to the current flowing through said first conductor proximate a first point thereof;

a second current monitor for generating a second signal responsive to the current flowing through said first conductor proximate a second point thereof;

first trip logic for selectively causing said first circuit interrupter to change state to its open state in response to said first signal and said second signal;

a communication channel operably connecting both of said first and second signals to said first trip logic;

a second circuit interrupter for selectively interrupting current through said first conductor proximate said second point thereof, said second circuit interrupter having an open state in which current cannot be conducted therethrough and a closed state in which current can be conducted therethrough;

second trip logic for selectively causing said second circuit interrupter to change state to its open state in response to said first signal and said second signal; and said communication channel further operably connecting both of said first and second signals to said second trip logic.

20. The system of claim 19 wherein said second trip logic causes said second circuit interrupter to change state to its open state when the direction of current through said first conductor proximate said first point thereof is different from the direction of current through said first conductor proximate said second point thereof.

21. The system of claim 19 wherein said second trip logic causes said second circuit interrupter to change state to its open state when the magnitude of current through said first conductor proximate said first point thereof is substantially different from the magnitude of current through said first conductor proximate said second point thereof.

22. The system of claim 19 wherein said second trip logic causes said second circuit interrupter to change state to its open state when said second trip logic fails to receive a signal from said first current monitor.

23. A method for isolating faults in a power distribution system comprising at least one conductor for carrying current, comprising the steps of:

monitoring the direction of current flowing through each end of a first conductor;

comparing the direction of current flowing through a first end of said first conductor to the direction of current flowing through a second end of said first conductor; and isolating said first conductor if the direction of current flowing through said first end of said conductor is different from the direction of current flowing through said second end of said first conductor.

24. A method for isolating faults in a power distribution system comprising a first plurality of conductors having one end connected to a first node and a second plurality of conductors having one end connected to a second node, a conductor common to said first and second pluralities of conductors having a first end connected to said first node and a second end connected to said second node, comprising the steps of:

monitoring the direction of current flowing through each of said first end and said second end of said common conductor;

comparing the direction of current flowing through said first end of said common conductor to the direction of current flowing through a second end of said common conductor; and isolating said common conductor if the direction of current flowing through said first end of said common conductor is different from the direction of current flowing through said second end of said common conductor.

25. A method for identifying and isolating faults in a power distribution system comprising at least one conductor for carrying current, comprising the steps of:

monitoring the magnitude of current flowing through each end of a first conductor; and comparing the magnitude of current flowing through a first end of said first conductor to the magnitude of current flowing through a second end of said first conductor; and isolating said first conductor if the magnitude of current flowing through said first end of said first conductor is substantially different from the magnitude of current flowing through said second end of said first conductor.

26. A method for isolating faults in a power distribution system comprising a first plurality of conductors having one end connected to a first node and a second plurality of conductors having one end connected to a second node, a conductor common to said first and second pluralities of conductors having a first end connected to said first node and a second end connected to said second node, comprising the steps of:

monitoring the magnitude of current flowing through each of said first end and said second end of said common conductor;

comparing the magnitude of current flowing through said first end of said common conductor to the magnitude of current flowing through a second end of said common conductor; and isolating said common conductor if the magnitude of current flowing through said first end of said common conductor is different from the magnitude of current flowing through said second end of said common conductor.

* * * * *